US008977324B2

(12) United States Patent
Hatton et al.

(10) Patent No.: US 8,977,324 B2
(45) Date of Patent: *Mar. 10, 2015

(54) AUTOMATIC EMERGENCY CALL LANGUAGE PROVISIONING

(71) Applicant: Ford Global Technologies, LLC, Dearborn, MI (US)

(72) Inventors: David Anthony Hatton, Berkley, MI (US); Brian Y. Wilkerson, Westland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/909,368

(22) Filed: Jun. 4, 2013

(65) Prior Publication Data
US 2013/0267193 A1 Oct. 10, 2013

Related U.S. Application Data

(62) Division of application No. 13/013,029, filed on Jan. 25, 2011, now abandoned.

(51) Int. Cl.
H04M 1/00 (2006.01)
H04W 4/22 (2009.01)
H04W 4/04 (2009.01)

(52) U.S. Cl.
CPC .............. H04W 4/22 (2013.01); H04W 4/046 (2013.01)
USPC ................. 455/569.2; 455/404.1; 455/404.2; 455/456.1; 455/521; 455/575.9

(58) Field of Classification Search
CPC ...... G01C 21/26; G01C 21/34; G01C 21/343; G01C 21/3608; G01C 21/3626; H04M 1/6075; H04M 1/6038; H04M 1/642

USPC ............. 455/404.1, 404.2, 456.1–456.3, 457, 455/569.1, 569.2

See application file for complete search history.

(56) References Cited

U.S. PATENT DOCUMENTS 4,442,485 A 4/1984 Ota et al.
4,833,477 A 5/1989 Tendler
(Continued)

FOREIGN PATENT DOCUMENTS

DE 102008060567 A1 * 10/2010
EP 1507129 A1 2/2005
(Continued)

OTHER PUBLICATIONS

Ford Motor Company, "SYNC with Navigation System," Owner's Guide Supplement, SYNC System Version 1 (Jul. 2007).
(Continued)

Primary Examiner — Dai A Phuong
(74) Attorney, Agent, or Firm — Jennifer M. Stec; Brooks Kushman P.C.

(57) ABSTRACT

A computer-implemented method includes receiving coordinates, at a vehicle associated computing system (VACS), corresponding to a vehicle's location. The method also includes using the VACS to compare the coordinates to a predetermined set of geographic borders, wherein the geographic borders determine at least language boundaries. The method further includes using the VACS to determine a local language based at least in part on the coordinate comparison. The method additionally includes using the VACS to transmit an emergency message in at least the determined local language.

6 Claims, 5 Drawing Sheets

(56) References Cited

U.S. PATENT DOCUMENTS

| | | | |
|---|---|---|---|
| 4,937,796 A | 6/1990 | Tendler | |
| 5,144,323 A | 9/1992 | Yonkers | |
| 5,223,844 A | 6/1993 | Mansell et al. | |
| 5,388,147 A | 2/1995 | Grimes | |
| 5,515,043 A | 5/1996 | Berard et al. | |
| 5,555,286 A | 9/1996 | Tendler | |
| 5,598,460 A | 1/1997 | Tendler | |
| 5,649,059 A | 7/1997 | Tendler et al. | |
| 5,736,962 A | 4/1998 | Tendler | |
| 5,825,098 A | 10/1998 | Darby | |
| 5,918,180 A | 6/1999 | Dimino | |
| 6,014,555 A | 1/2000 | Tendler | |
| 6,073,004 A | 6/2000 | Balachandran | |
| 6,151,385 A | 11/2000 | Reich et al. | |
| 6,266,617 B1 | 7/2001 | Evans | |
| 6,275,713 B1 | 8/2001 | Toda | |
| 6,292,551 B1 | 9/2001 | Entman et al. | |
| 6,496,107 B1 | 12/2002 | Himmelstein | |
| 6,504,909 B1 | 1/2003 | Cook et al. | |
| 6,516,198 B1 | 2/2003 | Tendler | |
| 6,519,463 B2 | 2/2003 | Tendler | |
| 6,532,372 B1 | 3/2003 | Hwang | |
| 6,608,887 B1 | 8/2003 | Reksten et al. | |
| 6,647,270 B1 | 11/2003 | Himmelstein | |
| 6,680,998 B1 | 1/2004 | Bell et al. | |
| 6,757,528 B1 | 6/2004 | Cardina et al. | |
| 6,775,356 B2 | 8/2004 | Salvucci et al. | |
| 6,778,820 B2 | 8/2004 | Tendler | |
| 6,952,155 B2 | 10/2005 | Himmelstein | |
| 7,027,842 B2 | 4/2006 | Zhang et al. | |
| 7,034,238 B2 | 4/2006 | Uleski et al. | |
| 7,050,818 B2 | 5/2006 | Tendler | |
| 7,092,723 B2 | 8/2006 | Himmelstein | |
| 7,113,091 B2 | 9/2006 | Script et al. | |
| 7,119,669 B2 | 10/2006 | Lundsgaard et al. | |
| 7,123,926 B2 | 10/2006 | Himmelstein | |
| 7,139,549 B2 * | 11/2006 | Islam et al. | 455/404.1 |
| 7,164,921 B2 | 1/2007 | Owens et al. | |
| 7,228,145 B2 | 6/2007 | Burritt et al. | |
| 7,233,795 B1 * | 6/2007 | Ryden | 455/445 |
| 7,305,243 B1 | 12/2007 | Tendler | |
| 7,400,886 B2 | 7/2008 | Sahim et al. | |
| 7,447,508 B1 | 11/2008 | Tendler | |
| 7,450,955 B2 | 11/2008 | Himmelstein | |
| 7,463,896 B2 | 12/2008 | Himmelstein | |
| 7,479,900 B2 | 1/2009 | Horstemeyer | |
| 7,482,952 B2 | 1/2009 | Horstemeyer | |
| 7,505,772 B2 | 3/2009 | Himmelstein | |
| 7,536,189 B2 | 5/2009 | Himmelstein | |
| 7,548,158 B2 | 6/2009 | Titus et al. | |
| 7,574,195 B2 | 8/2009 | Krasner et al. | |
| 7,580,697 B2 | 8/2009 | Lappe et al. | |
| 7,580,782 B2 | 8/2009 | Breed et al. | |
| 7,596,391 B2 | 9/2009 | Himmelstein | |
| 7,599,715 B2 | 10/2009 | Himmelstein | |
| 7,626,490 B2 | 12/2009 | Kashima | |
| 7,706,796 B2 | 4/2010 | Rimoni et al. | |
| 7,747,291 B2 | 6/2010 | Himmelstein | |
| 7,783,304 B2 | 8/2010 | Himmelstein | |
| 7,825,901 B2 | 11/2010 | Potera | |
| 7,844,282 B1 | 11/2010 | Tendler | |
| 7,885,685 B2 | 2/2011 | Himmelstein | |
| 7,894,592 B2 | 2/2011 | Book et al. | |
| 7,902,960 B2 | 3/2011 | Tsuchimochi et al. | |
| 7,907,976 B2 | 3/2011 | Himmelstein | |
| 7,957,772 B2 | 6/2011 | Charlier et al. | |
| 8,036,634 B2 | 10/2011 | Dimeo et al. | |
| 8,060,117 B1 | 11/2011 | Tendler | |
| 8,224,346 B2 | 7/2012 | Himmelstein | |
| 8,396,447 B2 | 3/2013 | Reich et al. | |
| 2001/0044302 A1 | 11/2001 | Okuyama | |
| 2002/0086718 A1 | 7/2002 | Bigwood et al. | |
| 2003/0227381 A1 | 12/2003 | Best, Jr. | |
| 2003/0231550 A1 | 12/2003 | MacFarlane | |
| 2004/0162064 A1 | 8/2004 | Himmelstein | |
| 2004/0183671 A1 | 9/2004 | Long | |
| 2005/0037730 A1 | 2/2005 | Montague | |
| 2005/0048948 A1 | 3/2005 | Holland et al. | |
| 2005/0099275 A1 | 5/2005 | Kamdar et al. | |
| 2005/0119030 A1 | 6/2005 | Bauchot et al. | |
| 2005/0197174 A1 | 9/2005 | Hasan et al. | |
| 2005/0222933 A1 | 10/2005 | Wesby | |
| 2005/0275505 A1 | 12/2005 | Himmelstein | |
| 2006/0049922 A1 | 3/2006 | Kolpasky et al. | |
| 2006/0061483 A1 | 3/2006 | Smith et al. | |
| 2006/0071804 A1 | 4/2006 | Yoshioka | |
| 2006/0165015 A1 | 7/2006 | Melick et al. | |
| 2006/0217105 A1 | 9/2006 | Kumar P S et al. | |
| 2006/0224305 A1 | 10/2006 | Ansari et al. | |
| 2006/0261940 A1 * | 11/2006 | Defant et al. | 340/539.13 |
| 2006/0262103 A1 | 11/2006 | Hu et al. | |
| 2006/0288053 A1 | 12/2006 | Holt et al. | |
| 2007/0050248 A1 | 3/2007 | Huang et al. | |
| 2007/0053513 A1 | 3/2007 | Hoffberg | |
| 2007/0106897 A1 | 5/2007 | Kulakowski | |
| 2007/0142028 A1 | 6/2007 | Ayoub et al. | |
| 2007/0171854 A1 | 7/2007 | Chen et al. | |
| 2007/0203643 A1 | 8/2007 | Ramaswamy et al. | |
| 2007/0218923 A1 | 9/2007 | Park et al. | |
| 2007/0243853 A1 | 10/2007 | Bumiller et al. | |
| 2007/0264990 A1 | 11/2007 | Droste et al. | |
| 2007/0281603 A1 | 12/2007 | Nath et al. | |
| 2008/0039018 A1 | 2/2008 | Kim | |
| 2008/0080687 A1 | 4/2008 | Broms | |
| 2008/0139118 A1 | 6/2008 | Sanguinetti | |
| 2008/0140665 A1 | 6/2008 | Ariel et al. | |
| 2008/0143497 A1 | 6/2008 | Wasson et al. | |
| 2008/0150683 A1 | 6/2008 | Mikan et al. | |
| 2008/0177541 A1 | 7/2008 | Satomura | |
| 2008/0180237 A1 | 7/2008 | Fayyad et al. | |
| 2008/0208446 A1 | 8/2008 | Geelen et al. | |
| 2008/0243545 A1 | 10/2008 | D'Ambrosia et al. | |
| 2009/0002145 A1 | 1/2009 | Berry et al. | |
| 2009/0099732 A1 | 4/2009 | Pisz | |
| 2009/0149153 A1 | 6/2009 | Lee | |
| 2009/0160607 A1 | 6/2009 | Edwards et al. | |
| 2009/0161836 A1 * | 6/2009 | Oesterling | 379/32.01 |
| 2009/0164053 A1 | 6/2009 | Oesterling | |
| 2009/0186596 A1 | 7/2009 | Kaltsukis | |
| 2009/0187300 A1 | 7/2009 | Everitt et al. | |
| 2009/0253403 A1 | 10/2009 | Edge et al. | |
| 2009/0261958 A1 | 10/2009 | Sundararajan et al. | |
| 2009/0286504 A1 | 11/2009 | Krasner et al. | |
| 2010/0035598 A1 | 2/2010 | Lee et al. | |
| 2010/0058333 A1 | 3/2010 | Peterson | |
| 2010/0069018 A1 | 3/2010 | Simmons et al. | |
| 2010/0076764 A1 | 3/2010 | Chengalvaraya | |
| 2010/0097239 A1 | 4/2010 | Campbell et al. | |
| 2010/0190479 A1 * | 7/2010 | Scott et al. | 455/414.1 |
| 2010/0202368 A1 | 8/2010 | Hans | |
| 2010/0210211 A1 | 8/2010 | Price | |
| 2010/0227582 A1 | 9/2010 | Berry et al. | |
| 2010/0227584 A1 | 9/2010 | Hong | |
| 2010/0240337 A1 | 9/2010 | Dimeo et al. | |
| 2010/0253535 A1 | 10/2010 | Thomas et al. | |
| 2010/0273466 A1 * | 10/2010 | Robertson et al. | 455/416 |
| 2010/0323657 A1 | 12/2010 | Barnard et al. | |
| 2010/0323660 A1 | 12/2010 | Himmelstein | |
| 2010/0330972 A1 | 12/2010 | Angiolillo | |
| 2011/0003578 A1 | 1/2011 | Chen et al. | |
| 2011/0028118 A1 | 2/2011 | Thomas | |
| 2011/0059720 A1 | 3/2011 | Penix et al. | |
| 2011/0071880 A1 | 3/2011 | Spector | |
| 2011/0098016 A1 | 4/2011 | Hatton | |
| 2011/0201302 A1 | 8/2011 | Hatton | |
| 2011/0202233 A1 | 8/2011 | Hatton | |
| 2011/0225228 A1 | 9/2011 | Westra et al. | |
| 2011/0230159 A1 | 9/2011 | Hatton | |
| 2011/0275321 A1 | 11/2011 | Zhou et al. | |
| 2012/0028599 A1 | 2/2012 | Hatton et al. | |
| 2012/0041675 A1 * | 2/2012 | Juliver et al. | 701/465 |
| 2012/0053782 A1 | 3/2012 | Gwozdek et al. | |

(56) References Cited

U.S. PATENT DOCUMENTS

| | | | |
|---|---|---|---|
| 2012/0209505 A1* | 8/2012 | Breed et al. | 701/409 |
| 2012/0264395 A1* | 10/2012 | Bradburn et al. | 455/404.1 |
| 2012/0281605 A1 | 11/2012 | Himmelstein | |

FOREIGN PATENT DOCUMENTS

| | | |
|---|---|---|
| EP | 2093982 A1 | 12/2007 |
| EP | 2219163 A1 | 1/2009 |
| EP | 2037664 | 3/2009 |
| JP | 2001043472 | 2/2001 |
| JP | 2003022490 | 1/2003 |
| JP | 2006005744 | 1/2006 |
| JP | 2006270564 | 10/2006 |
| WO | WO2008011432 A2 | 1/2008 |

OTHER PUBLICATIONS

Ford Motor Company, "SYNC," Owner's Guide Supplement, SYNC System Version 1 (Nov. 2007).

Ford Motor Company, "SYNC with Navigation System," Owner's Guide Supplement, SYNC System Version 2 (Oct. 2008).

Ford Motor Company, "SYNC," Owner's Guide Supplement, SYNC System Version 2 (Oct. 2008).

Ford Motor Company, "SYNC with Navigation System," Owner's Guide Supplement, SYNC System Version 3 (Jul. 2009).

Ford Motor Company, "SYNC," Owner's Guide Supplement, SYNC System Version 3 (Aug. 2009).

Kermit Whitfield, "A hitchhiker's guide to the telematics ecosystem", Automotive Design & Production, Oct. 2003, http://findarticles.com, pp. 1-3.

Wayne Thalls, "Santa Cruz Ares Handbook", Santa Cruz Ares 1990, pp. 1-29.

Notice of Reasons for Rejections, JP2010-514958; Dec. 4, 2012; 3 pages.

Intellectual Property Office Examination Report; GB1117765.6; dated Aug. 22, 2013; 2 pages.

Wikipedia, "e-Call" project of the European Commission web page (e-Call—Wikipedia, the free encyclopedia).

"eCall Toolbox" web page (SafetySupport, 2005).

EPO Search Report; 11153638.9-1525; mailed May 27, 2011.

PCT Search Report; PCT App. PCT/US10/027451; Mailed May 20, 2010.

PCT Search Report; PCT/US08/66878; Mailed Aug. 7, 2008.

EPO Extended Search Report; 11009966.0-2413; dated May 24, 2012.

EPO Search Report; 11154014.2-2414; dated May 31, 2011.

European MoU for Realisation of Interoperable in-Vehicle eCall; May 28, 2004; 7 Pages.

Office Action, Non-Final Rejection, dated Apr. 22, 2013.

* cited by examiner

| Base Lauguage | Spanish | German | French |
|---|---|---|---|
| a | Sound_file_1 | Sound_file_2 | Sound_file_3 |
| a | Sound_file_4 | Sound_file_5 | Sound_file_6 |
| a | Sound_file_7 | Sound_file_8 | Sound_file_9 |
| a | Sound_file_10 | Sound_file_11 | Sound_file_12 |
| a | Sound_file_13 | Sound_file_14 | Sound_file_15 |

AUTOMATIC EMERGENCY CALL LANGUAGE PROVISIONING

CROSS-REFERENCE TO RELATED APPLICATIONS

This application is a division of U.S. application Ser. No. 13/013,029 filed Jan. 25, 2011, the disclosure of which is incorporated in its entirety by reference herein.

TECHNICAL FIELD

The illustrative embodiments relate to a method and apparatus for automatically provisioning an emergency phone call placed by a vehicle computing system (including, but not limited to, recognizing local emergency call protocol, switching languages to a local language, etc.).

BACKGROUND

Many vehicles come equipped with a variety of automatic computing systems. As computers grow more powerful, it is possible to add a multitude of functions to these computing systems.

For example, without limitation, the FORD SYNC system gives a user access to a powerful set of tools when traveling. The user can receive and make phone calls through the system, check email, send and receive text messages, check sports scores and weather, order carry out/drive-through food, play games, receive driving directions, etc.

In these illustrative examples, one method of connection is done through a user's cellular phone or other nomadic device. The vehicle computing system, such as, but not limited to, the FORD SYNC system, connects to the user's nomadic device, and uses that device to establish a connection with a remote network. Using connection options like Voice Over IP (VOIP) and/or a data connection, information can be sent to and from the vehicle computing system.

In addition to user initiated communication, it may be possible for the vehicle computing system to initiate communication on its own. The system may need to check a remote network for updates, or may need to process ongoing data transfer for a previously requested service.

In at least one instance, it may be desirable to have the vehicle equipped with functionality for automatically placing emergency phone calls in the event of a vehicle accident. Such a system is described in some detail in pending U.S. application Ser. No. 11/769,346, entitled "METHOD AND SYSTEM FOR EMERGENCY NOTIFICATION", filed Jun. 27, 2007; and U.S. application Ser. No. 12/399,513, entitled "METHOD AND SYSTEM FOR EMERGENCY CALL HANDLING", filed Mar. 6, 2009; and U.S. application Ser. No. 12/607,244, filed Oct. 28, 2009, entitled "METHOD AND SYSTEM FOR EMERGENCY CALL PLACEMENT", the contents of which are incorporated herein by reference.

Typically, when a call is placed, the language of the call will be determined by the language spoken by the vehicle computing system when communicating with the user, or by the default language as determined for a particular region, or determined at the end line of manufacturing, etc. For example, if the user has the vehicle computing system set to English, then the call will be placed in English. This has the potential, however, to create complications if the user drives the vehicle across a border between countries.

For example, if the user drove from America to Mexico, then the language may be set to English, but the emergency call may be placed to a Mexican Emergency Operator, and the operator may only speak Spanish. This could impair or even prevent successful completion of the emergency call.

SUMMARY

In a first illustrative embodiment, a computer-implemented method includes receiving coordinates, at a vehicle associated computing system (VACS), corresponding to a vehicle's location. The illustrative method also includes using the VACS to compare the coordinates to a predetermined set of geographic borders, wherein the geographic borders determine at least language boundaries.

In this illustrative embodiment, the method further includes using the VACS to determine a local language based at least in part on the coordinate comparison. The illustrative method additionally includes using the VACS to transmit an emergency message in at least the determined local language.

In a second illustrative embodiment, a computer-implemented method, implemented by a vehicle computing system (VACS) includes determining that a vehicle crash has occurred. The exemplary method also includes determining if a cellular phone is connected to the VACS and, if a cellular phone is connected to the VACS, placing an emergency call through the cellular phone, unless the call is not cancelled by a passenger.

Additionally, the illustrative method further includes once a call has been placed, checking for an off-hook condition. The method also includes determining if an MCC code is available for use in a language determination.

The illustrative method further includes determining if vehicle GPS coordinates are available for use in a language determination and using at least one of: an MCC code, GPS coordinates, or the non-availability of both the MCC code and the GPS coordinates to determine an appropriate language for an emergency message.

The illustrative method additionally includes transmitting the emergency message in the determined appropriate language.

In a third illustrative embodiment, a computer readable storage medium stores instructions that, when executed by a vehicle associated computing system (VACS), cause the VACS to perform the method including receiving coordinates corresponding to a vehicle's location. The method also includes comparing the coordinates to a predetermined set of geographic borders, wherein the geographic borders determine at least language boundaries.

The VACS is also caused to determine a local language based at least in part on the coordinate comparison and transmit an emergency message in at least the determined local language.

BRIEF DESCRIPTION OF THE DRAWINGS

Other aspects and characteristics of the illustrative embodiments will become apparent from the following detailed description of exemplary embodiments, when read in view of the accompanying drawings, in which.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The present invention is described herein in the context of particular exemplary illustrative embodiments. However, it will be recognized by those of ordinary skill that modification, extensions and changes to the disclosed exemplary illustrative embodiments may be made without departing from the true scope and spirit of the instant invention. In short, the following descriptions are provided by way of example only, and the present invention is not limited to the particular illustrative embodiments disclosed herein.

Figure 1:
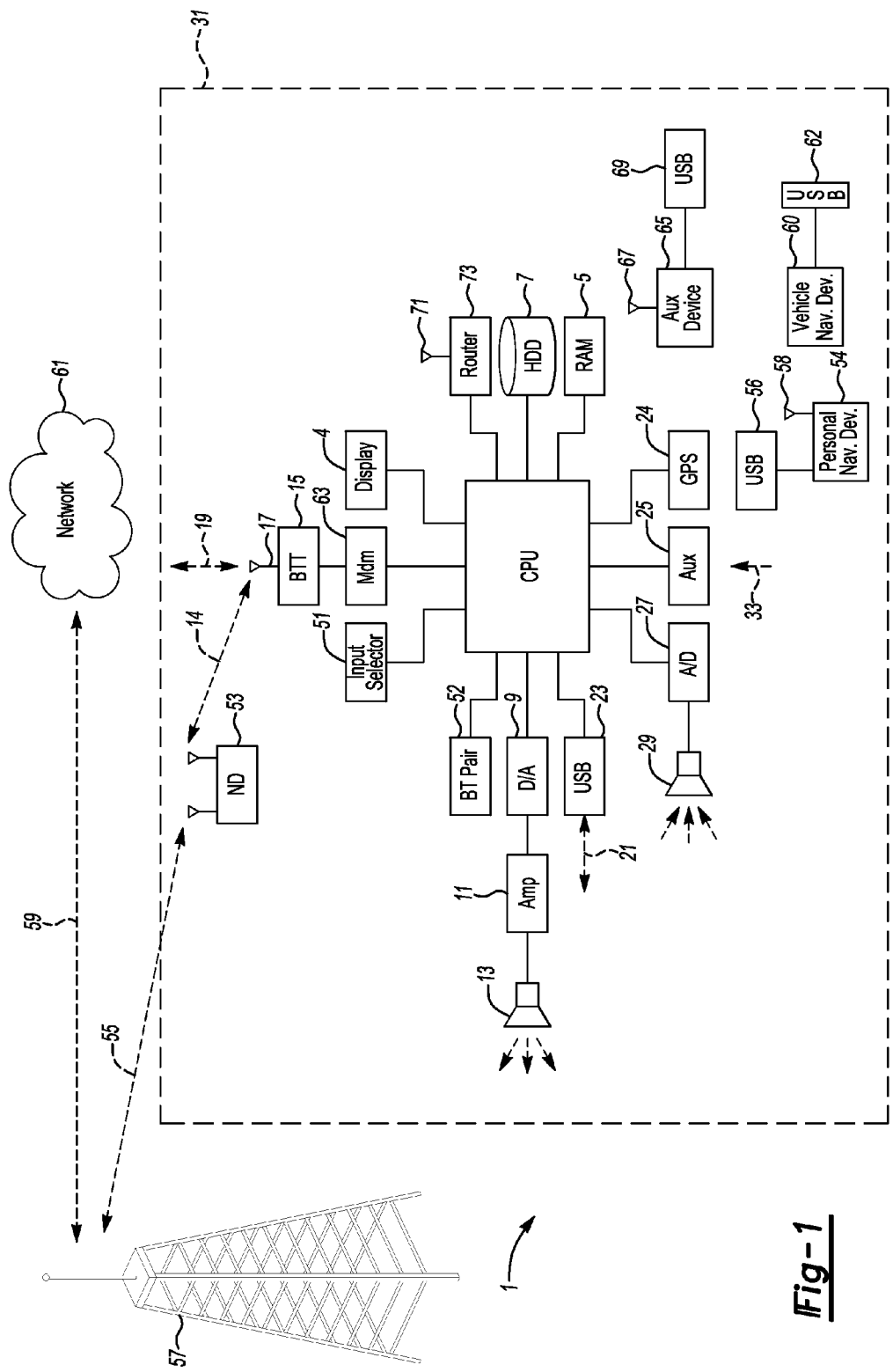
FIG. 1 shows an exemplary illustrative vehicle-based computing system.

FIG. 1 illustrates system architecture of an illustrative onboard communication system usable for delivery of directions to an automobile. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, audible speech and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7 (both of which are also memory circuits). In this illustrative embodiment, the non-persistent storage is random access memory (RAM) and the persistent storage is a hard disk drive (HDD) or flash memory.

The processor is also provided with a number of different inputs allowing the user to interface with the processor. In this illustrative embodiment, a microphone 29, an auxiliary input 25 (for input 33), a USB input 23, a GPS input 24 and a BLUETOOTH input 15 are all provided. An input selector 51 is also provided, to allow a user to swap between various inputs. Input to both the microphone and the auxiliary connector is converted from analog to digital by a converter 27 before being passed to the processor.

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, etc.). The nomadic device can then be used to communicate 59 with a network 61 outside the vehicle 31 through, for example, communication 55 with a cellular tower 57.

Pairing a nomadic device 53 and the BLUETOOTH transceiver 15 can be instructed through a button 52 or similar input, telling the CPU that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 in order to transfer data between CPU 3 and network 61 over the voice band. In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example).

If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is affixed to vehicle 31.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58; or a vehicle navigation device 60, having a USB 62 or other connection, an onboard GPS device 24, or remote navigation system (not shown) having connectivity to network 61.

Further, the CPU could be in communication with a variety of other auxiliary devices 65. These devices can be connected through a wireless 67 or wired 69 connection. Also, or alternatively, the CPU could be connected to a vehicle based wireless router 73, using for example a WiFi 71 transceiver. This could allow the CPU to connect to remote networks in range of the local router 73.

Figure 2:
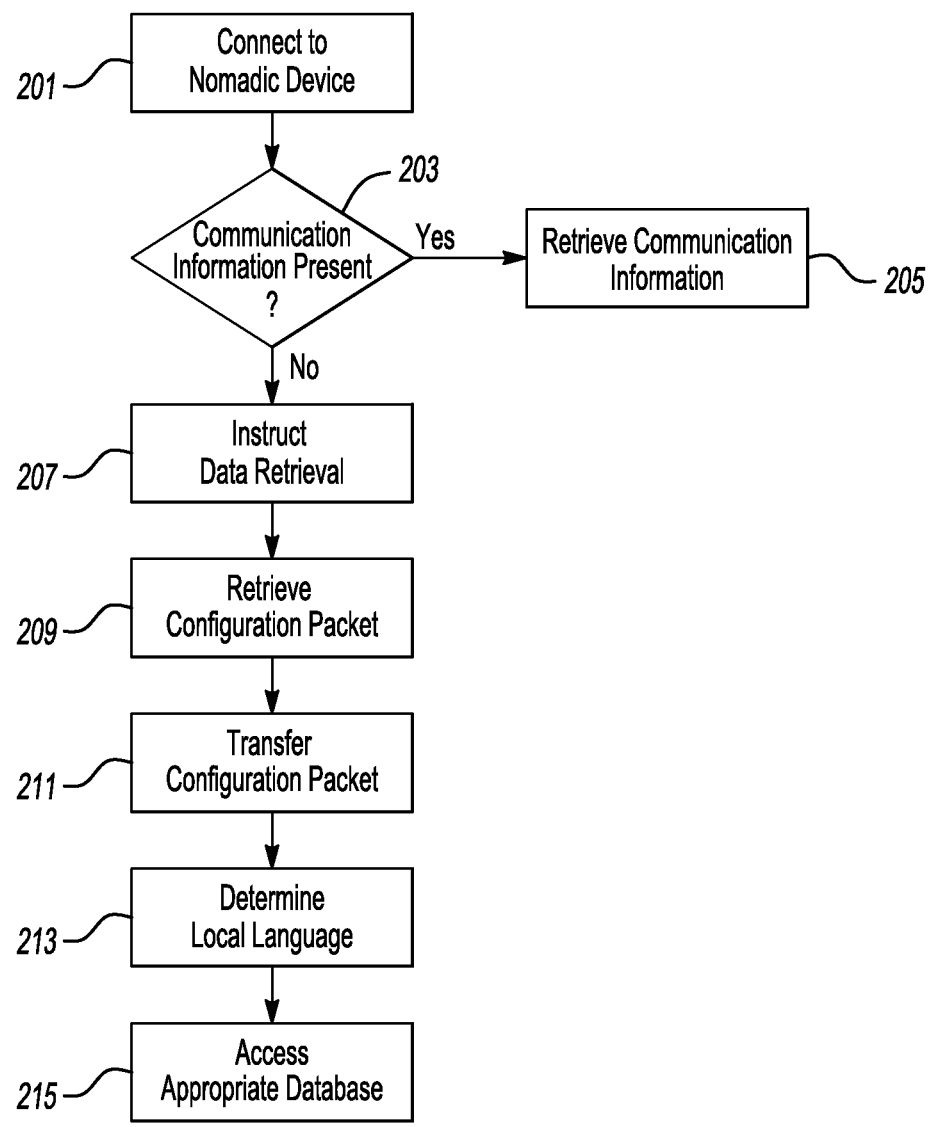
FIG. 2 shows an illustrative example of at least one method for automatically provisioning an emergency call language.

FIG. 2 shows an illustrative example of at least one method for automatically provisioning an emergency call language based on a determination that a new language is appropriate based on, for example, a vehicle location.

Although a user could drive for a thousand miles in America and never cross a national border, such a trip in, for example, Europe, is almost certain to cross one or more national borders. While it may be common for citizens of Europe to each speak several languages, it is not desirable to rely on the ability of an emergency operator to speak the language of a user, when the user is outside of a home country.

For example, if the user originated in France, then the user may have set the vehicle computing system to respond to and speak in French. This could be the user's own language, a common international language, such as English, and may also be the language of the Emergency Operator for any emergency phone calls placed while in France.

If the user were to travel in the vehicle, however, a drive of several hours could easily find the user in Germany. While it may be possible that a particular German Emergency Operator could speak French, it is certainly not preferable to rely on such an occurrence in the event of a vehicle emergency, such as an accident. Further, if the operator doesn't speak French, not only will the vehicle communication system be unable to successfully communicate with the operator in French, but if the driver only speaks French, then even an open line between the driver and the operator will be to no avail.

In this illustrative embodiment, however, the vehicle communication system can automatically switch to a local language, so that emergency communication is possible between the operator and the vehicle, even if no one in the vehicle speaks the appropriate language.

When a cellular phone, or other nomadic device, connects to a cellular tower in, for example, Europe, configuration information may be passed between the tower and the device. This information can be used to establish a connection between the tower and the device, and, in particular, it may also contain a code (such as a mobile country code (MCC)) establishing the country of origin of the tower (or some other designation based on a code).

In this illustrative embodiment, a vehicle computing system polls a paired nomadic device periodically to obtain at least a designation code. The system opens a connection to the nomadic device 201. The system then checks to see if cellular communication information is stored within the device 203. For example, if the device stores a configuration packet received from a cellular tower or other communication point, then the system may be able to retrieve that packet from the device 205.

If there is no such data stored locally in the device, then the system may instruct the nomadic device to initiate communication with a cellular tower or other communication point 207, in order to receive a configuration packet 209.

The configuration packet is then transferred from the nomadic device to the vehicle computing system 211. Based on an origin code or other designation, the vehicle computing system can determine the local language of choice 213. In this illustrative example, a lookup table is used for this determination, although other suitable methods may also be used.

Once a local language is determined, the vehicle computing system can set up access to, for example, a preset database of words in that language 215. In the event an emergency call is placed, the system can draw on this database to communicate with an emergency operator.

In this illustrative embodiment, fully switching between language packs when the local language changes is not the preferred option. It can take up to a minute to switch the language of the vehicle computing system to another installed language pack. Further, it may be that the language option for the local language is not presently installed in the user's vehicle computing system. Installing the language could require a charge, a lengthy download, or even possibly physical insertion of a persistent memory device containing a new language. Since an accident could occur within seconds of passing into a new country, a delay in switching to the appropriate language may cause failure of an emergency call.

It is possible, however, to perform the illustrative switching of languages using a full language swap. In such an instance it would be desirable, but not necessary, to have a computer with the ability to either speak in two languages at once or swiftly swap between language packs. This would allow communication with the driver in a first language and the operator in a second language. Such embodiments are contemplated and within the scope of the present invention.

Figures 3, 4:
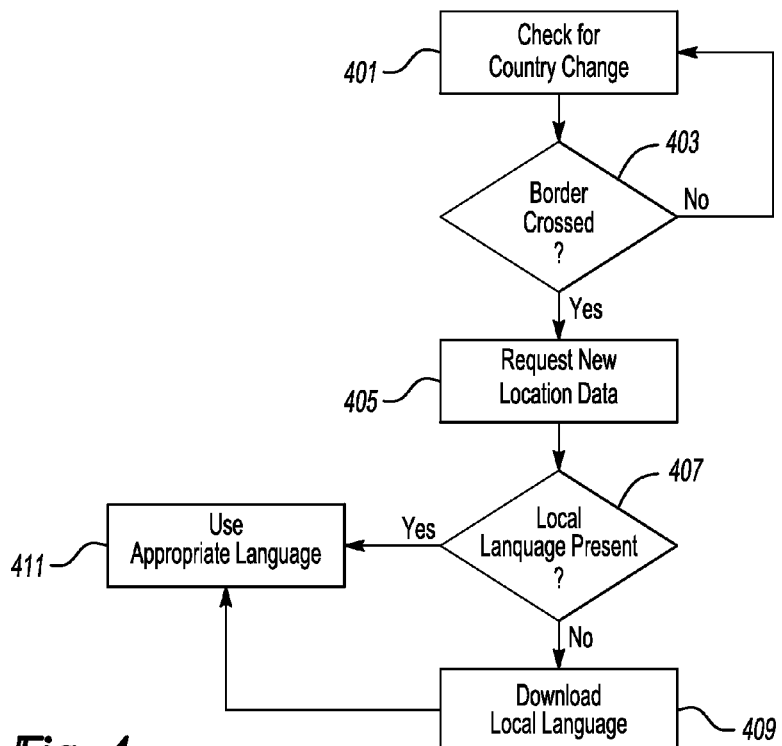
FIG. 3 shows an example of a portion of a database consisting of a plurality of commonly used emergency "key words"
FIG. 4 shows an illustrative embodiment of a routine to determine if a country line is crossed 401.

In this illustrative embodiment, however, a database consisting of a plurality of commonly used emergency "key words" is used. An example of a portion of such a database is shown in FIG. 3.

For example, the phrase "a crash has occurred at GPS location 100.01, 200.01" may be one common phrase (with the coordinates corresponding to vehicle GPS coordinates).

The vehicle computing system could determine that this phrase needs to be spoken to an emergency operator. Since, in this embodiment, the vehicle computing system is not speaking a local language, it will have to use the language lookup table provided for emergency purposes.

The computing system can break the determined phrase into several portions, such as, but not limited to "a" "crash" "has occurred" "at" "GPS location" "1" "0" "0" "." "0" "1" "2" "0" "0" "." "0" "1". So the vehicle computing system will generate an automatic phrase to be spoken, such as the above phrase, and then a lookup may be performed if the local language is different from the language in which the phrase was generated.

In one illustrative example, a Present Language Local Language conversion is used. In this example, the system would search a small table (FIG. 5) for the word "a" in a first column 301. Once that word is found, the system would then play or retrieve the local language version of that word 303, saved as an individual sound file, in this example, associated with the table. In such a manner, the entire phrase shown above can be quickly replicated without having to load a new language pack with thousands or tens of thousands of un-needed words.

A dialogue consisting of hundreds or even thousands of possible emergency messages can be developed from only a few hundred or fewer key words. Much or all of the essential information for emergency services can be contained in this dialogue, and thus fast language switching can be performed.

Although this example shows a Present Language→Local Language conversion, it may also be desirable to convert the present language to a common language (such as, for example, English) and then use a Common Language→Local Language lookup table. This might make it easier to create new language tables for languages to be added to the list of possible language choices, since the new language would not then need to be paired with some or all of the existing languages in the system.

In this illustrative example, the vehicle computing system would perform a first lookup to determine the English equivalent of a word to be spoken, and then would cross reference that equivalent with a second lookup table, comprising an English→Local Language conversion, much in the manner of FIG. 3.

Other methods of lookup and conversion are also contemplated, and are within the scope of the present invention. For example, without limitation, each word could be assigned a common table entry number, and the appropriate table entry for a particular word would then be chosen. In such an embodiment, for example, "a" may always be found at entry 1, so the system would know to use the sound bite stored at entry 1 in the local language emergency database when playing the word "a". Other suitable methods may also be used.

In yet a further illustrative embodiment, geo-fencing may also be used for one or more purposes in conjunction with the illustrative embodiment. For example, without limitation, geo-fencing may be used to determine which local language is appropriate, or it may be used to determine when a switch between languages needs to be made.

In this illustrative embodiment, shown in FIG. 4, the system uses GPS coordinates to determine if a country line is crossed 401. If the user's present coordinates do not indicate that a new country has been entered 403, then the system can continue to poll for country change 401. Else, if a new country has been entered 405, the system can send a signal to a cellular tower to retrieve local language information 407.

In addition to retrieving local language information, the system may not contain the appropriate local language emergency database for the present country of travel. In this illustrative example, once a local language is determined, the system can check to see if a local language emergency database is present 409. If there is no database 411, the system can use the nomadic device to download the local language database 413 (which may result in a user prompt for the download). Once downloaded, that database can be selected as the basis for emergency calls 415.

In yet another illustrative example, the determination that a new country has been entered could be used as the basis for determining a local language. For example, it may be the case that a local cellular signal does not contain a code usable to determine the local language. In this instance, the system can determine, based on the GPS coordinates, in what country the user is presently traveling.

The system can then use a lookup table to determine the local language of that country. This lookup table can be stored locally or remotely, since it only needs to be accessed once when a new country is entered. In all of these examples, it is to be understood that language swapping can also be based on crossing non-national borders. For example, if the northern half of a particular country speaks a first language and the southern half speaks a second language, merely passing between these regions of the same country may be sufficient to trigger a change in the local language. This change again could be recognized by a cellular code, geo-fencing, a combination of factors, etc.

Geo-fencing and/or embedded cellular codes can also be used to determine if a new emergency number should be called in the event of an emergency. For example, in America, the emergency number is 911, but in England it is 999.

It may also be the case that a user does not have, and does not have access to, a local language emergency database. In this event, one of several default situations can be employed. The system could default to English, for example, or to the factory default language based on country of origin. The system could also default to the presently selected language.

In yet another example, the system could receive a request from an emergency operator for a particular language, and, based on that request, use a corresponding language database if available.

In still another illustrative embodiment, it may be the case that certain basic protocols must be followed when placing an emergency call. For example, in certain areas of America, once a call is placed, the number 1 must be pressed on the phone to confirm that an actual emergency is occurring.

These protocols may vary from region to region. A lookup table can also provide regional protocols, so that, based on, for example, a known emergency number or GPS coordinates, the vehicle computing system knows to perform certain protocols while in certain regions to ensure that an emergency call is properly completed.

In these illustrative embodiments, the emergency operator may be given a menu driven set of prompts allowing communication of requested emergency information. Since the vehicle manufacturer knows in advance the configurations of the menus and what types of information may be provided based on those menus, it should be relatively easy to compile a predetermined set of common emergency words and phrases that will make up the emergency language database. Thus, even if the vehicle occupant does not speak the local language, help can still be properly obtained in the event of a vehicle emergency.

In addition to breaking up countries by the geographic border of the country, it may also be possible to break a country into multiple languages based on a region of the country in which a driver is traveling. For example, in some countries in Europe, multiple languages are spoken as common languages. Depending on the region in which a driver is traveling, a different language may be appropriate as the "common" language. Since a division of the country by the geo-graphic borders may not be sufficient to identify this distinction, the country may be sub-divided based on interior boundaries (which can be provider-defined) that designate different regions corresponding to different languages.

Figure 5:
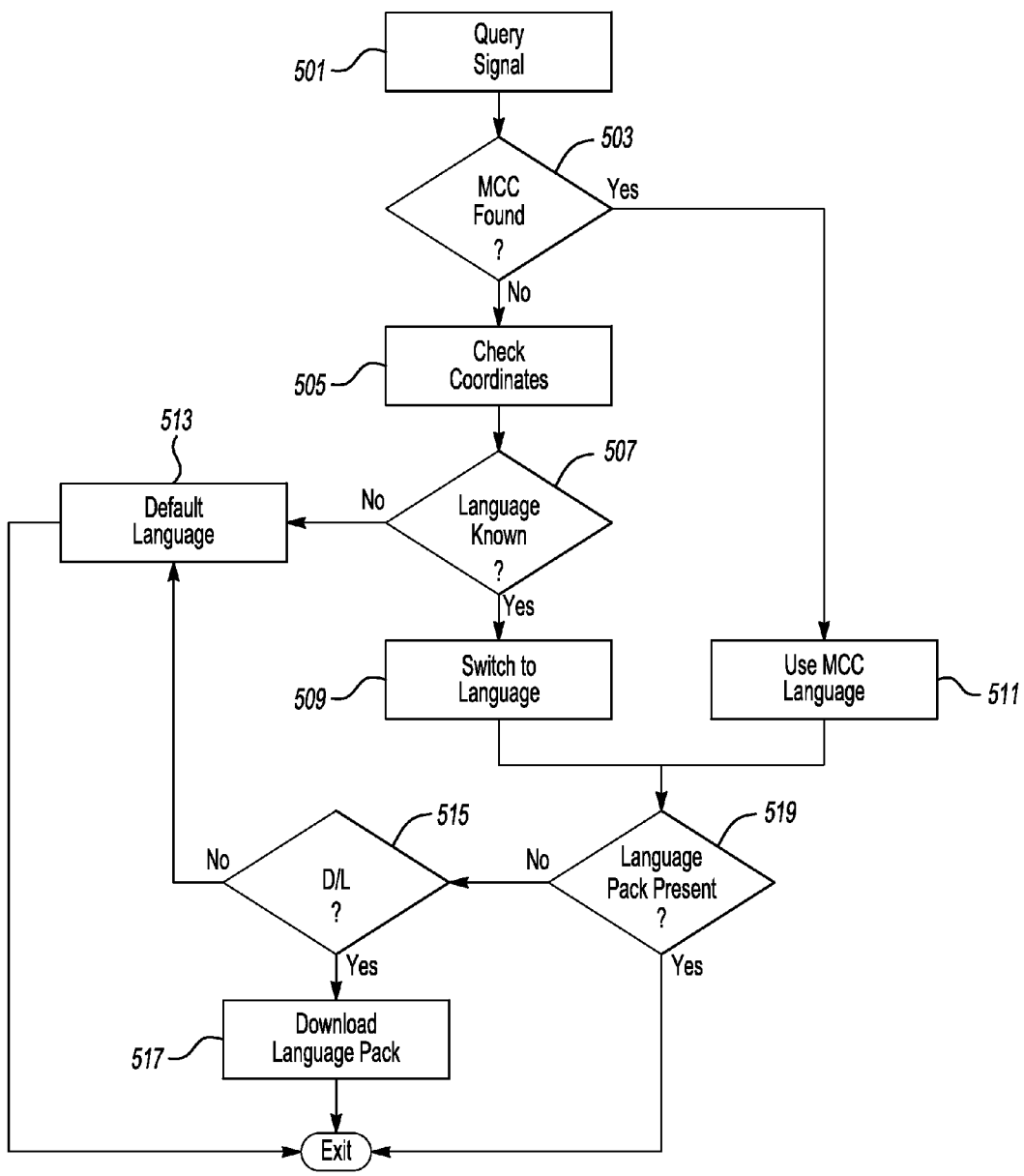
FIG. 5 shows an illustrative example of a language determination process.

In the illustrative embodiment shown in FIG. 5, a vehicle associated computing system (VACS) sends a query signal to a remote server, for example 501. Alternatively or additionally, a language could be determined at the time of an incident (as opposed to querying for the local language).

If the query signal results in an MCC 503 (a code designating a preferred language, often embedded in a cellular signal or retrievable from a cellular signal provider), the vehicle computing system designates the MCC language 511 as the preferred language to use for emergency communication.

If there is no MCC code present, the VACS checks the current coordinates of the vehicle 505 (available from, for example, without limitation, a GPS device in communication with the VACS). Once the GPS coordinates are known, the VACS can check to see if a language is known for the region in which the coordinates are located 507. This check can be done locally or remotely, depending on where the language database with coordinate designations is available.

If the language for the region in which the vehicle is traveling is known 507 (e.g., if the VACS or other system can identify an appropriate language to use), the VACS switches to this language for use in emergency communication 509. If the language is not known (e.g., without limitation, the vehicle is traveling in a region for which an appropriate emergency language is not known), the VACS may choose to use a default language (or the previously selected language, or a vehicle installed language, etc.) 513.

If the VACS switches languages to a language that is different from the presently selected language (possible in steps 511 or 509), the VACS checks to see if a corresponding language pack is installed 519. For example, without limitation, a vehicle having European languages installed may travel into Russia and not have Russian installed. If the language is installed, the system can use the language in the event of an emergency call.

If the language is not installed, the VACS checks to see if the language should be downloaded 515. Language downloads may be subscription based, they may be available on a limited basis for some other reason, they may be universally available, etc. If downloading is available, the system downloads the appropriate language pack 517. If downloading is not available, the system may resort to a default language 513.

Figure 6:
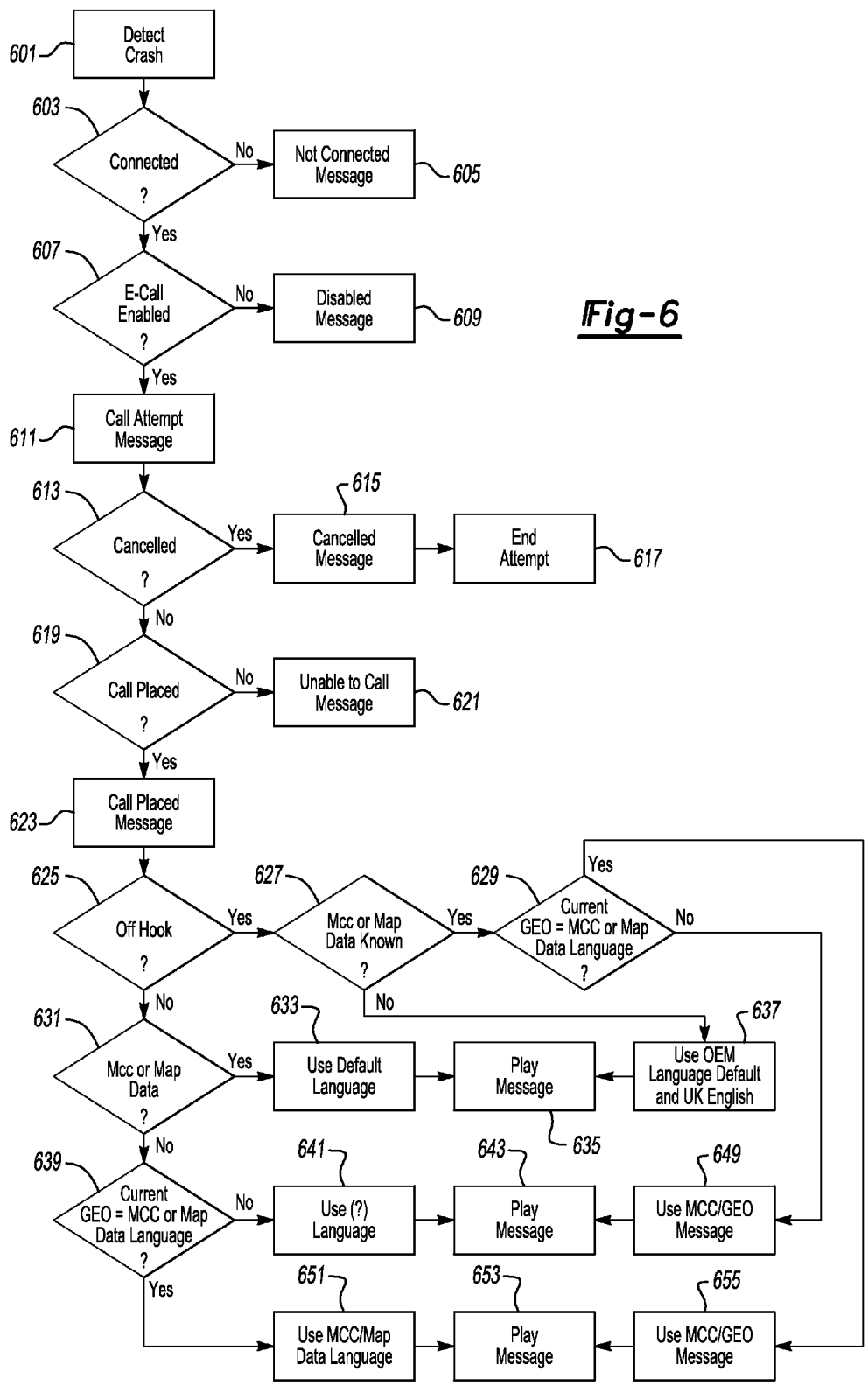
FIG. 6 shows an illustrative example of an emergency call process.

FIG. 6 shows an illustrative example of an emergency call language choice determination process. This is just one example of how an emergency process may work, shown for illustrative purposes. In this illustrative embodiment, the language of choice is determined when an emergency event is detected, but the language may also be pre-determined at a point prior to an accident.

In this embodiment, the vehicle associated computing system first detects that a crash has occurred 601. This crash detection can include, but is not limited to, the triggering of an impact sensor, airbag deployment, or any other number of vehicle system detectable events.

Once the crash has been detected, the system checks to see if a wireless device is paired to the vehicle computing system (so, for example, the call can be made through the device) 603. If the device is not connected (and possibly if no device is available for pairing), the system will output a not-connected message 605. This may allow a driver to pair a phone or enable a phone, or, at a minimum, use a non-connected phone to place an emergency call.

If there is a connection available, the system checks to see if the driver has disabled emergency calling. In some embodiments, it may not be possible to disable emergency calling, but if emergency calling can be disabled, the system checks to see if it has been disabled 607. If emergency calling has been disabled, the system notifies the driver that the call will not be made 609.

If there is an available connection and emergency calling is enabled, the system may notify a driver that an emergency call is being attempted 611. While this notification is ongoing, and before the call is placed, the driver may have an option to cancel the emergency call 613. If the call is cancelled, the system may notify the driver that the call has been cancelled 615, and cease attempting to call an emergency operator 617. Although not shown, if there is no connection or the emergency call system is disabled, the system may also cease attempting to call, or, in those situations, may delay calling if the driver indicates that a phone is being connected or the process is being enabled (or if the driver is attempting to do either option, with or without indication).

If there is no cancellation 613, the system may check to see if a call has been placed 619. If the call cannot be placed (service unavailable, connection died, cellular signal unavailable, etc), the system may notify a driver that it was unable to place the requested call 621. Otherwise, the system may notify the driver that a call has been placed 623.

Once the call is in progress, the process may check for an off-hook condition 625. An off-hook condition indicates that a call has been answered, although some systems may not provide a detectable off-hook signal. If an off-hook condition is not detected (possibly after a predetermined time period or number of rings, to allow time for connection), the system checks to see if an MCC code is available for the call or current vehicle GPS coordinates are available 627. MCC codes may be available from cellular signal providers, and indicate a preferred language for calls. Additionally or alternatively, GPS coordinates of a vehicle may be compared to a pre-determined map that shows a correspondence between a location and a preferred language, if the coordinates are available.

If there are no MCC codes, usable coordinates, or other suitable method of determining a language, the system may elect to use both an OEM default language and English (unless that is the OEM default language) 637. Using both of these languages, the system plays a message 635 multiple times in both languages. Hopefully, an emergency responder will be able to comprehend at least one of the messages, during one of the playbacks. It is possible to only play the message a single time in one language or once in both languages as well.

In one non-limiting illustrative embodiment, the emergency message may be as follows:

<Attention: A crash has occurred in a [MAKE]/[MODEL] vehicle. Standby for GPS coordinates, spoken twice, followed by an open line connection with vehicle occupants>. <At any time, press 1 to repeat coordinates or press 0 to open the line>. <Sending location>. <tone=*>. <A crash has occurred in [MAKE]/[MODEL] vehicle at the following coordinates–latitude x.xxx and longitude y.yyy>. <Repeating location>. <tone=*>. <A crash has occurred in [MAKE]/[MODEL] vehicle at the following coordinates–latitude x.xxx and longitude y.yyy>. <Line open>.

In this embodiment, the portions between the < > are pre-recorded sentences that are available in a variety of language packs. The portions [MAKE] and [MODEL] are also pre-recorded and inserted in the sentence at the appropriate location, and the coordinates are based on pre-recorded numbers 0-9. This is just one example of how emergency calls can be prepared in multiple languages, and is provide for purposes of example only.

The message 635 may also be played in the event that an off-hook condition is detected 625 and MCC, GPS data, and/or other language determination data is not known 631. Again, it may be played in an OEM language, English (or some other suitable fallback language), and may be played multiple times or once. In one illustrative embodiment, the message may be played more times when an off-hook condition is not detected, since it is unknown whether or not an operator is listening.

Whether or not an off-hook condition is detected, if there are no MCC codes, and if the GPS coordinates are available, the system may check to see if the GPS coordinates correspond to either an MCC code or a similar language indicator determinable from coordinates 629, 639. If the language is not determinable from the current coordinates, the system may play the following message (one or more times, depending on a preference and/or whether an off-hook condition is detected):

<Attention: A crash has occurred in a [MAKE]/[MODEL] vehicle. Standby for GPS coordinates, spoken twice, followed by an open line connection with vehicle occupants>. <User vehicle language is set to [SYNC LANG]>. <At any time, press 1 to repeat coordinates or press 0 to open the line>. <Sending location>. <tone=*>. <A crash has occurred in [MAKE]/[MODEL] vehicle at the following coordinates–latitude x.xxx and longitude y.yyy>. <Repeating location>. <tone=*>. <A crash has occurred in [MAKE]/[MODEL] vehicle at the following coordinates–latitude x.xxx and longitude y.yyy>. <Line open>.

In this embodiment, the additional <User vehicle language is set to [SYNC LANG]> comment has been added. This will provide an emergency operator with an indication of what language may currently be being spoken by the system, and/or let the operator know a likely language of the vehicle occupant(s). Another operator or a translator familiar with the language of preference may then be placed on the call, based on the capacities of the emergency call facility.

If the MCC code is available and/or the GPS coordinates are available and correspond to a known language, the system will at least use the corresponding selected language to play the following message (or a similarly suitable message) one or more times, as appropriate:

<Attention: A crash has occurred in a [MAKE]/[MODEL] vehicle. Standby for GPS coordinates, spoken twice, followed by an open line connection with vehicle occupants>. <User vehicle language is set to [SYNC LANG]>. <At any time, press 1 to repeat coordinates or press 0 to open the line>. <Sending location>. <tone=*>. <A crash has occurred in [MAKE]/[MODEL] vehicle at the following coordinates–latitude x.xxx and longitude y.yyy>. <Repeating location>. <tone=*>. <A crash has occurred in [MAKE]/[MODEL] vehicle at the following coordinates–latitude x.xxx and longitude y.yyy>. <Line open>.

Hopefully, since the MCC code or GPS coordinates indicate a local, preferred language, the message will be played in a language that the emergency operator can comprehend.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A computer-implemented method comprising:
   determining a message-language based on a mobile country code (MCC) code provided to a mobile device, global positioning system (GPS) coordinates provided to a vehicle computing system (VCS), or the non-availability of both; and
   generating an emergency message in the message-language, via the VCS, using an emergency local language datafile, having emergency-related words stored therein, representing a limited local language subset, when a crash occurs.

2. The method of claim 1, wherein, if an MCC code is not available and the vehicle GPS coordinates are not available, the language is determined to be a default language included with the vehicle.

3. A system comprising:
   a processor configured to:
   determine a message-language based on a mobile country code (MCC) code provided to a mobile device, global positioning system (GPS) coordinates provided to a vehicle computing system (VCS), or the non-availability of both; and
   generate an emergency message in the message-language, via the VCS, using an emergency local language datafile, having emergency-related words stored therein, representing a limited local language subset, when a crash occurs.

4. The method of claim 3, wherein, if an MCC code is not available and the vehicle GPS coordinates are not available, the language is determined to be a default language included with the vehicle.

5. A non-transitory computer-readable storage medium, storing instructions that, when executed by a vehicle computing system, cause the system to perform a method comprising:
   determining a message-language based on a mobile country code (MCC) code provided to a mobile device, global positioning system (GPS) coordinates provided to a vehicle computing system (VCS), or the non-availability of both; and
   generating an emergency message in the message-language, via the VCS, using an emergency local language datafile, having emergency-related words stored therein, representing a limited local language subset, when a crash occurs.

6. The storage medium of claim 5, wherein, if an MCC code is not available and the vehicle GPS coordinates are not available, the language is determined to be a default language included with the vehicle.

* * * * *